United States Patent [19]

Satoh

[11] Patent Number: 5,435,231
[45] Date of Patent: Jul. 25, 1995

[54] POWER PISTON ASSEMBLY FOR BOOSTER

[75] Inventor: Tohru Satoh, Saitama, Japan

[73] Assignee: Jidosha Kiki Co., Ltd., Tokyo, Japan

[21] Appl. No.: 303,480

[22] Filed: Sep. 9, 1994

[30] Foreign Application Priority Data

Oct. 8, 1993 [JP] Japan .................. 5-277446

[51] Int. Cl.⁶ .............................. F01B 19/04
[52] U.S. Cl. ........................... 92/99; 403/375
[58] Field of Search ............... 92/99; 403/374, 375

[56] References Cited

U.S. PATENT DOCUMENTS

| | | | |
|---|---|---|---|
| 2,495,209 | 1/1950 | Chilo | 403/375 |
| 4,747,336 | 5/1988 | Uyama | 91/376 |
| 4,787,292 | 11/1988 | Tsuyuki et al. | 91/369.3 |
| 4,951,550 | 8/1990 | Ohki et al. | 91/369.3 |
| 5,287,793 | 2/1994 | Satoh et al. | 91/376 |
| 5,337,650 | 8/1994 | Uyama | 91/376 |

FOREIGN PATENT DOCUMENTS

| | | | |
|---|---|---|---|
| 512267 | 4/1955 | Canada | 403/375 |
| 542652 | 1/1932 | Germany | 403/375 |
| 1-9871 | 1/1989 | Japan . | |

Primary Examiner—F. Daniel Lopez
Attorney, Agent, or Firm—Flynn, Thiel, Boutell & Tanis

[57] ABSTRACT

An improvement of an axial portion of a power piston and a retainer engaging therewith for a booster. An axial portion of the power piston is formed with a first tubular portion, which is provided with a second tubular portion located outward of the first tubular portion. The first tubular portion is fitted over a flange of a valve body from the rear side, and an annular retainer engages the second tubular portion from the front side, thereby securing the axial portion of the power piston, which is formed with the both tubular portions, on the flange of the valve body. The retainer includes a plurality of engaging pawls, which engage the outer peripheral surface of the second tubular portion of the power piston by point contact. This reduces the axial size of the valve body, and hence the axial size of the booster.

4 Claims, 3 Drawing Sheets

POWER PISTON ASSEMBLY FOR BOOSTER

FIELD OF THE INVENTION

The invention relates to a power piston assembly for booster, and more particularly, to an improvement of an axial portion of a power piston and a retainer which engages therewith.

DESCRIPTION OF THE PRIOR ART

A booster is known in the art comprising a valve body having a flange which bulges radially outward and which is formed around the outer periphery thereof at its front end, a power piston having a tubular portion formed in its axial portion which is fitted from the rear side upon the flange of the valve body and including a positioning portion which is formed at the rear end of the tubular portion and which is disposed in abutment against the rear end face of the flange, and an annular retainer which prevents the tubular portion of the power piston from being disengaged from the flange (see Japanese Laid-Open Utility Model Application No. 9,871/1989, for example).

In the booster disclosed in this cited Application, the tubular portion of tile power piston projects forwardly beyond the front end face of the flange of the valve body, and a disc-shaped retainer is a press fit into the projecting tubular portion from the front side.

However, in this booster, the axial size of the tubular portion increases by an amount by which it projects forwardly beyond the front end face of the flange, resulting in a disadvantage that the resulting booster has an increased axial size.

SUMMARY OF THE INVENTION

In view of the foregoing, in a booster including a valve body having a flange which bulges radially outward and which is formed around the outer periphery thereof at its front end, a power piston having a tubular portion formed in its axial portion which is fitted from the rear side upon the flange of the valve body and including a positioning portion formed at the rear end of the tubular portion and which is disposed in abutment against the rear end face of the flange, and an annular retainer which prevents the tubular portion of the power piston from being disengaged from the flange, in accordance with the invention, the front end of the tubular portion is folded upon itself to extend rearwardly so as to define a second tubular portion radially outward of the tubular portion, and the outer peripheral edge of the retainer which is disposed in abutment against the front end face of the valve body is extended rearwardly to define a peripheral tubular portion, which is fitted over the second tubular portion of the power piston from the front side while simultaneously engaging a plurality of engaging pawls formed around the inner periphery of the peripheral tubular portion with the outer peripheral surface of the second tubular portion, the engaging pawls substantially engaging with the outer peripheral surface of the second tubular portion by point contact.

With this arrangement, there is no need to cause the front end of the tubular portion to project forwardly beyond the front end face of the flange, whereby the axial size of the tubular portion may be reduced than in the prior art.

Accordingly, the axial size of the booster can be reduced over the prior art. In addition, since each of the engaging pawls firmly engages with the outer peripheral surface of the second tubular portion by point contact, it is assured that the axial portion of the power piston be positively fixed on the flange of the valve body.

Above and other objects, features and advantages of the invention will become apparent from the following description of several embodiments thereof with reference To the drawings.

DETAILED DESCRIPTION OF EMBODIMENTS

Figure 1:
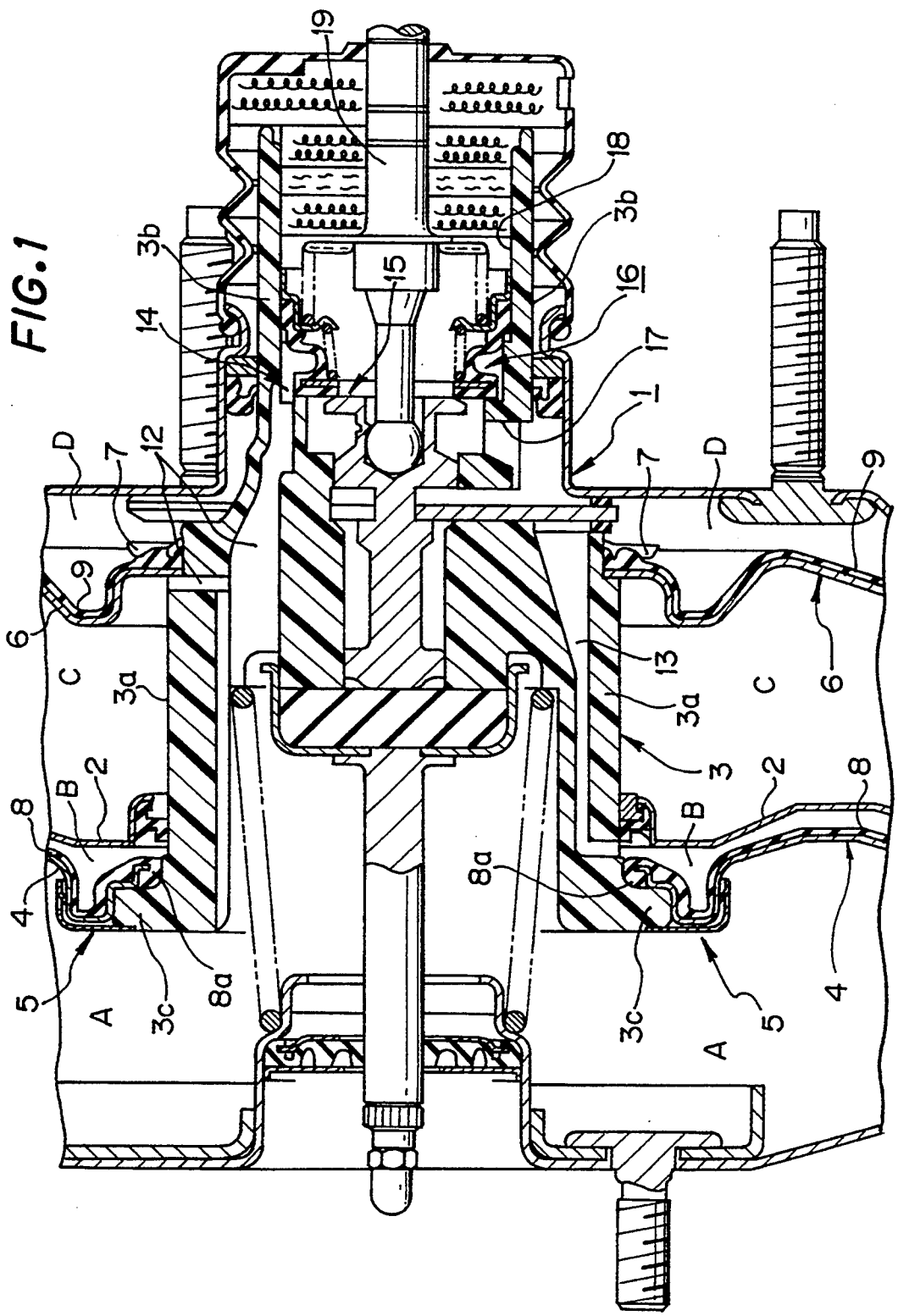
FIG. 1 is a schematic cross section of one embodiment of the invention.

Referring to the drawings which show several embodiments of the invention, the interior of a brake booster of tandem type is shown in FIG. 1. The interior of a shell 1 is divided by a center plate 2 into a pair of front and rear spaces, and a substantially cylindrical valve body 3 slidably extends through the axial portion of the center plate 2.

The valve body 3 includes a portion 3a of an increased diameter and a portion 3b of a reduced diameter, and is formed with a flange 3c, which bulges radially outward, at the front end of the portion 3a of an increased diameter, which defines the foremost end of the valve body 3. An axial portion of a front power piston 4 is mounted on the flange 3c and a disengagement thereof is prevented by an annular retainer 5 while an axial portion of a rear power piston 6 is connected around the rear end of the portion 3a of an increased diameter and is also prevented from being disengaged by another retainer 7.

Front and rear diaphragms 8, 9 are applied to the back surfaces of the power pistons 4, 6, respectively, thus defining a constant pressure chamber A and a variable pressure chamber B across the front diaphragm 8 and a constant pressure chamber C and a variable pressure chamber D across the rear diaphragm 9.

The both constant pressure chambers A, C communicate with each other through a constant pressure passage 12 formed in the valve body 3, and also communicates with a source of negative pressure through a tubing, not shown, which is connected to the front wall of the shell 1 so that a negative pressure is normally introduced into the both constant pressure chambers A, C. The both variable pressure chambers B, D communicate with each other through a variable pressure passage 13 formed in the valve body 3.

A valve mechanism 16, which is known in itself and comprising a vacuum valve 14 and an atmosphere valve 15, is disposed within the valve body 3. A space located radially outward of the vacuum valve 14 communicates with the both constant pressure chambers A, C through the constant pressure passage 12, and a space located between the atmosphere valve 15 and the vacuum valve 14 communicates with the rear variable pressure chamber D through a radially extending variable pressure passage 17 also formed in the valve body 3. Finally, a space located radially inward of the atmosphere valve 15 communicates with the atmosphere through a pressure passage 18 formed in the valve body 3.

The arrangement is such that as an input shaft 19 is moved back and forth, the valve mechanism 16 is actuated to switch the communication between the both constant pressure chambers A, C and the both variable pressure chambers B, D.

The described arrangement and its operation remain the same as a brake booster of tandem type which is known in the art.

Figure 2:
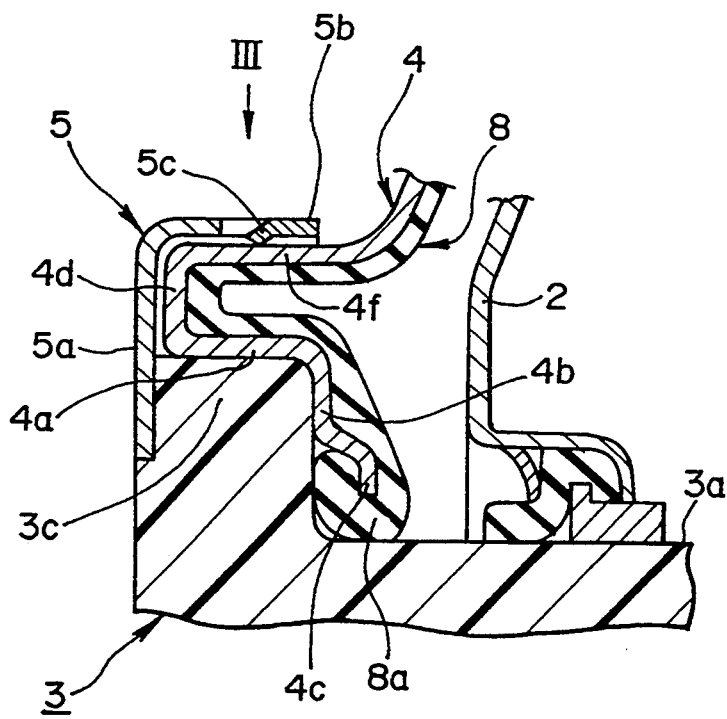
FIG. 2 shows part of FIG. 1 to an enlarged scale.

As shown to an enlarged scale in FIG. 2, an axial portion of the front power piston 4 in this embodiment is formed with a first tubular portion 4a which is fitted over the flange 3c of the valve body 3, and the rear end of the first tubular portion 4a is folded to extend radially inward to define a positioning portion 4b. The inner periphery of the positioning portion 4b extends rearwardly in the manner of a hook to define a connection piece 4c. The front diaphragm 8 includes a bead 8a extending around its inner periphery, which covers the connection piece 4c from radially inside to be connected therewith. The front end of the first tubular portion 4a initially extends radially outward to define a radial portion 4d, the outer periphery of which is then folded upon itself to define a second tubular portion 4f.

The axial portion of the front power piston 4 thus constructed is fitted, with the connection piece 4c connected with the bead 8a extending around the inner periphery of the front diaphragm 8, over the portion 3a of an increased diameter of the valve body 3 from the rear side so that the first tubular portion 4a is fitted around the peripheral surface of the flange 3c while the positioning portion 4b is disposed in abutment against the rear end face of the flange 3c.

In this manner, the bead 8a, which is connected with the connection piece 4c, is held in close contact against the rear end face of the flange 3c and against the outer peripheral surface of the portion 3a of an increased diameter. Under this condition, the radial portion 4d is located slightly rearward of the front end face of the flange 3c.

A retainer 5 engages the second tubular portion 4f when the power piston 4 is so located, thereby preventing the first tubular portion 4a of the power piston 4 from being disengaged from the flange 3c of the valve body 3.

Figure 3:
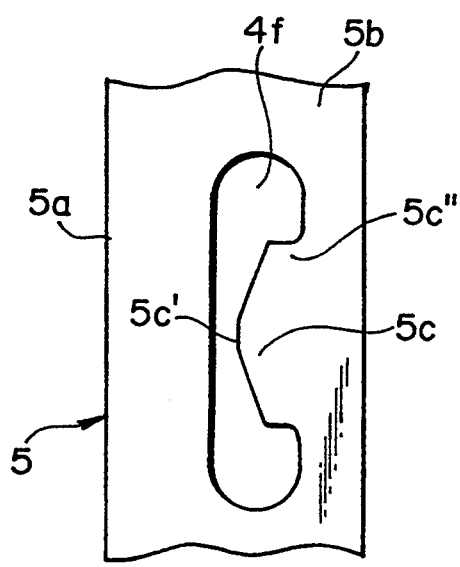
FIG. 3 is an enlarged plan view of part shown in FIG. 2, as viewed in the direction of an arrow III.

In the present embodiment, the retainer 5 is formed of a metal sheet member and includes a radially extending end face 5a, the outer peripheral edge of which is then extended axially rearward to define a peripheral tubular portion 5b, from which a plurality of engaging pawls 5c are punched at an equal circumferential spacing so as to extend radially inward therefrom. As shown in FIG. 3, each engaging pawl 5c is formed by punching the peripheral tubular portion 5b substantially in C-configuration, with the inner portion being bent radially inward. As shown, a tip 5c' of the pawl 5c has a reduced width than its base 5c'' where the pawl is bent. In other words, the tip 5c' is pointed to a chevron-shaped configuration by shaving off its opposite sides obliquely, whereby the tip 5c' has a width which is on the order of one-fifth the width of the base 5c''.

The peripheral tubular portion 5b of the retainer 5 thus formed is then disposed over the second tubular portion 4f of the front power piston 4, which is disposed in the manner mentioned above, as a press fit from the front side, and then the end face 5a of the retainer 5 is disposed in abutment against the front end face of the flange 3c.

Thereupon, the engaging pawls 5c formed to extend from the peripheral tubular portion 5b of the retainer 5 engage the second tubular portion 4f of the front power piston 4 by its own resilience, whereby the first tubular portion 4a and the positioning portion 4b of the front power piston 4 and the bead 8a of the front diaphragm 8 can be positively mounted on the flange 3c.

With this embodiment, the axial size of the first tubular portion 4a can be reduced as compared with a corresponding portion of a conventional brake booster, and hence the axial size of the entire brake booster can be reduced.

In the prior art practice, the front end of a tubular portion, corresponding to the first tubular portion 4a of the invention, projects forwardly beyond the front end face of the flange 3c so that a disc-shaped retainer, corresponding in function to the retainer 5 of the invention, may be disposed as a press fit into the projecting portion of the tubular portion. Accordingly, in the prior art arrangement, the axial size of the brake booster must be increased by an amount by which the tubular portion, corresponding to the first tubular portion 4a of the invention, projects beyond the front end face of the flange. By contrast, according to the present embodiment, there is no need to cause the front end face of the first tubular portion 4a to project beyond the front end face of the flange 3c. In this manner, the axial size of the brake booster of the invention can be reduced as compared with the prior art.

Because the tip 5c' of the engaging pawl 5c has a reduced width and nearly pointed, the tip 5c' engages the second tubular portion 4f of the front power piston 4 substantially by point contact. Because the forces are concentrated to the tip 5c', it advantageously bites into the outer peripheral surface of the second tubular portion 4f. In this manner, a high retaining force or resistance against withdrawal is obtained when the peripheral tubular portion 5b of the retainer 5 is disposed as a press fit over the second tubular portion 4f of the front power piston 4, thereby allowing the axial portion of the front power piston 4 to be firmly secured on the flange 3c of the valve body 3.

Figure 6:
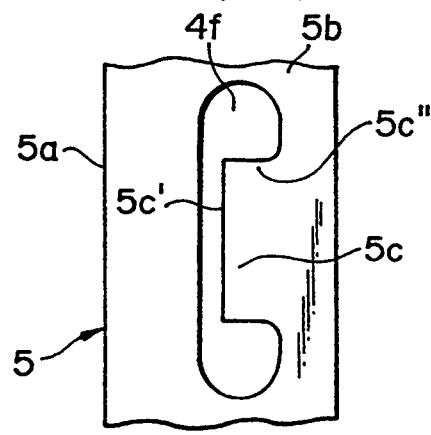
FIG. 6 is a plan view showing an engaging pawl of the prior art.

In contrast to the engaging pawl 5c of the present embodiment, in a conventional engaging pawl 5c used in the prior art as shown in FIG. 6, a tip 5c' has a width which is the same as that of a base 5c''. Accordingly, with the engaging pawl 5c of the prior art, the forces which are applied by the tip 5c' as it engages the second tubular portion 4f will be dispersed across the entire region of the tip 5c', degrading the biting into the second tubular portion 4f.

In addition, since the bead 8a, extending around the inner periphery of the front diaphragm 8, is held in close contact with the rear end face of the flange 3c and the outer peripheral surface of the portion 3a of an increased diameter, a hermetic seal in such region can be improved to a more positive one.

Figure 4:
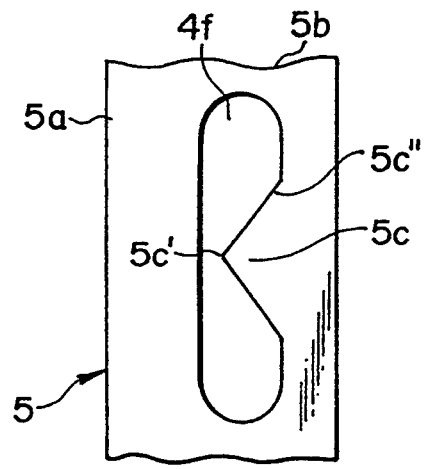
FIG. 4 is a plan view showing an engaging pawl according to a second embodiment.
Figure 5:
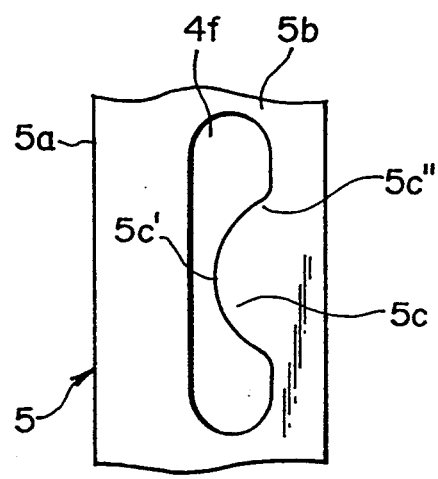
FIG. 5 is a plan view showing an engaging pawl according to a third embodiment.

FIGS. 4 and 5 show engaging pawls 5c according to a second and a third embodiment of the invention. In the second embodiment shown in FIG. 4, the entire configuration of the engaging pawl 5c is generally triangular, while in the third embodiment shown in FIG. 5, the engaging pawl 5c is generally semi-circular. In both these embodiments, the tip 5c' of the engaging pawl 5c engages the second tubular portion 4f of the front power piston 4 by point contact, thus achieving a favorable biting into the second tubular portion 4f in the similar manner as in the first embodiment.

While the invention has been described above as applied to a brake booster of tandem type, but it should be understood that the invention may be similarly applied to a brake booster of a single type or to a triple type which includes three pairs of constant and variable pressure chambers within the shell 1.

While the invention has been shown and described above in connection with the several embodiments thereof, it should be understood that a number of changes, modifications and substitutions therein will readily occur to one skilled in the art from the above disclosure without departing from the spirit and scope of the invention defined by the appended claims.

What is claimed is:

1. In a booster including a valve body having a flange which bulges radially outward and which is formed peripherally at its front end, a power piston having a tubular portion formed in its axial portion which is fitted upon the flange of the valve body from a rear side and including a positioning portion formed at a rear end of the tubular portion which is disposed in abutment against a rear end face of the flange, and an annular retainer which prevents the tubular portion of the power piston from being disengaged from the flange; a power piston assembly for booster characterized in that a front end of the tubular portion is folded upon itself to extend rearwardly to define a second tubular portion radially outward of the tubular portion, and in which an outer peripheral edge of the retainer which is disposed in abutment against a front end face of the valve body is extended rearwardly to define a peripheral tubular portion, which is fitted over the second tubular portion of the power piston from the front side, while concurrently causing a plurality of engaging pawls, formed on the peripheral tubular portion to extend radially inward therefrom, to engage with an outer peripheral surface of the second tubular portion, the engaging pawls engaging the outer peripheral surface of the second tubular portion substantially by point contact.

2. A power piston assembly according to claim 1 in which each of the engaging pawls is generally chevron-shaped, with a tip adapted to engage the outer peripheral surface of the second tubular portion and having a width one-fifth the width of a base of the pawl.

3. A power piston assembly according to claim 1 in which each of the engaging pawls is generally triangular, with a tip defining an apex of a triangle and engaging the outer peripheral surface of the second tubular portion.

4. A power piston assembly according to claim 1 in which each of the engaging pawls is generally semi-circular, a tip being defined by part of a circular edge and engaging the outer peripheral surface of the second tubular portion.

* * * * *